United States Patent Office 3,005,079
Patented Oct. 17, 1961

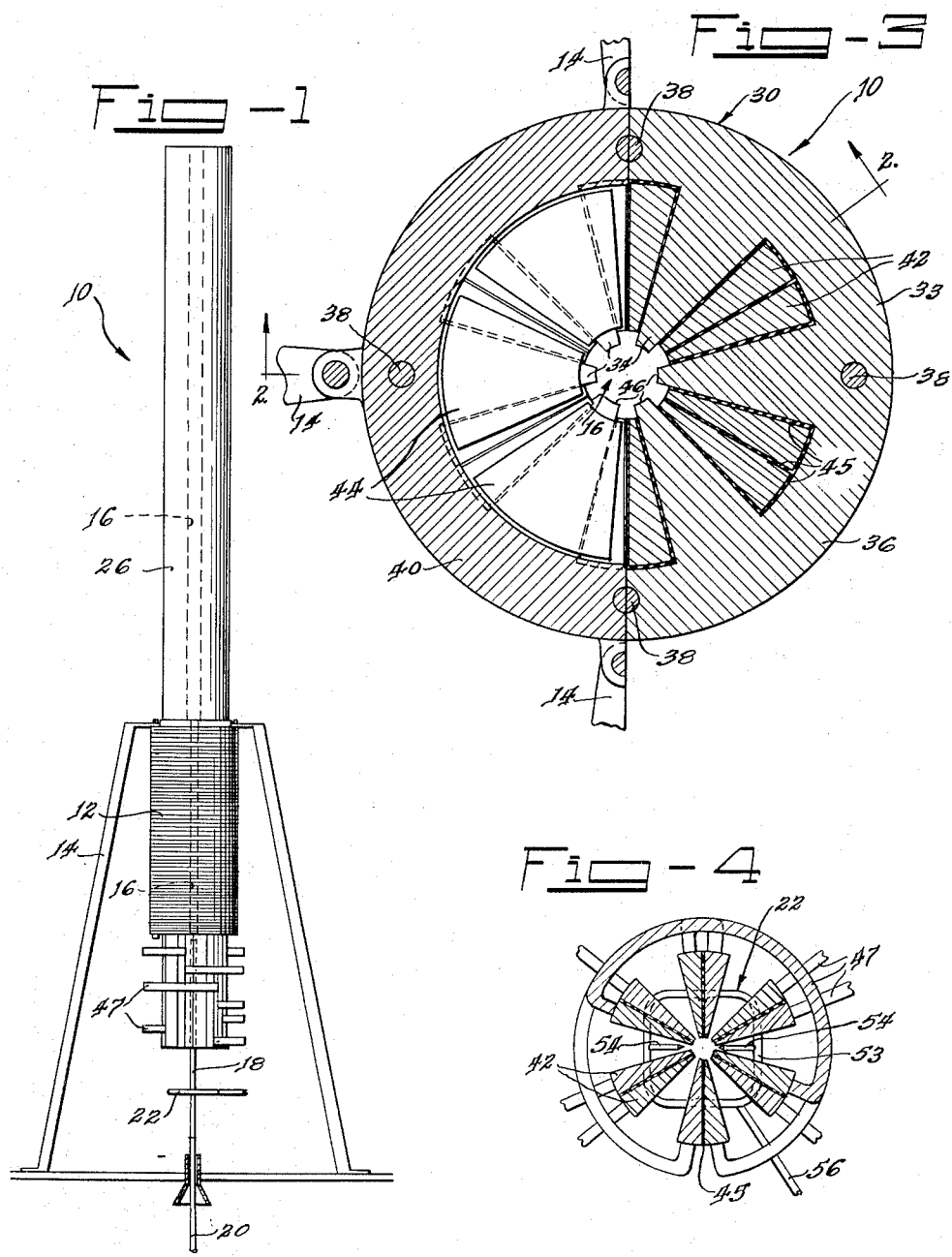

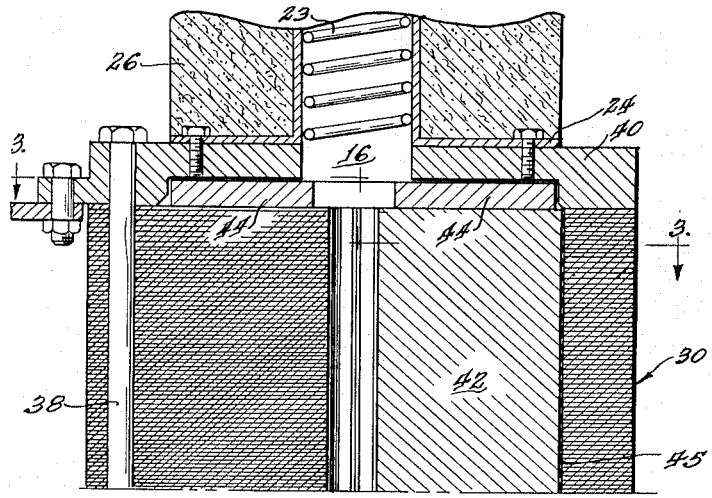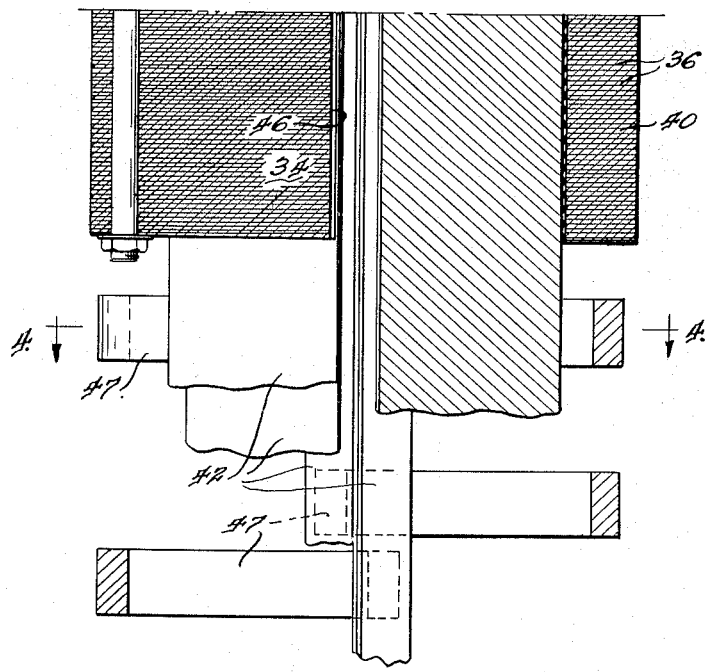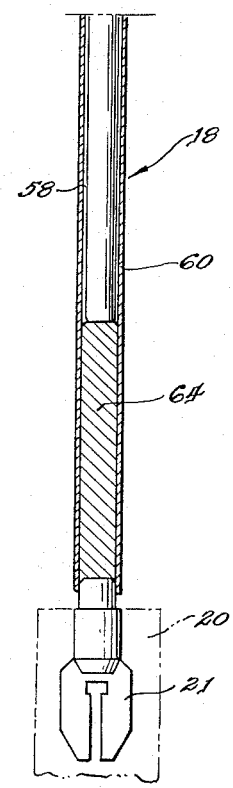

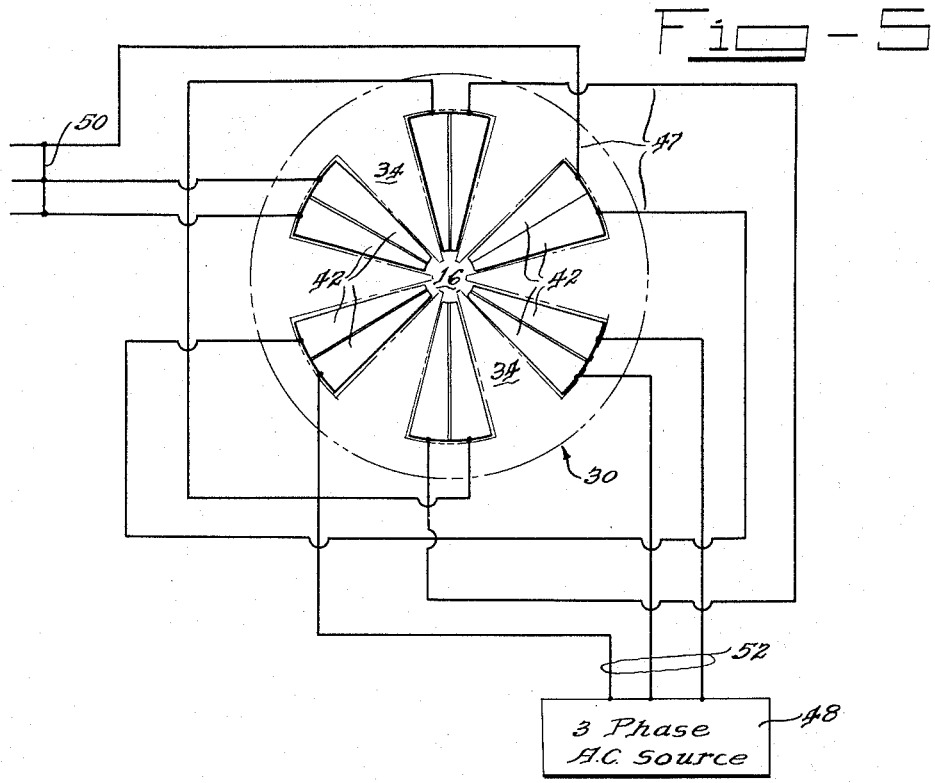
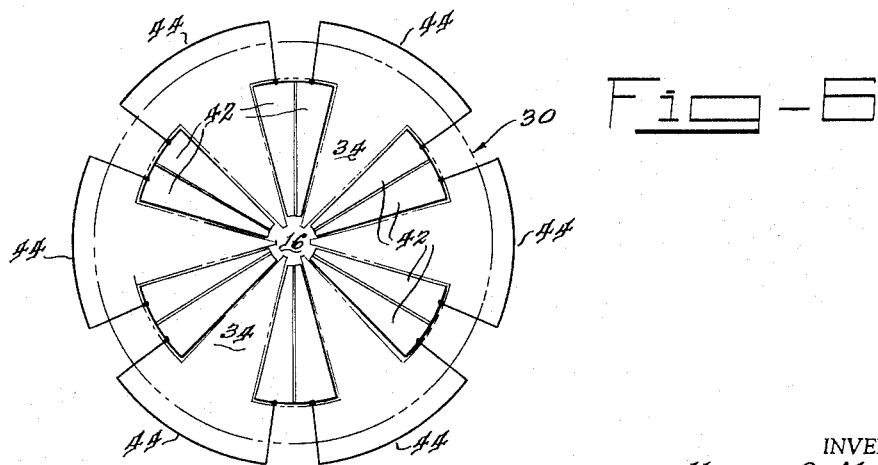

3,005,079
METHOD AND APPARATUS FOR EFFECTING THERMAL BONDS
Harry O. Monson, Elmhurst, and Robert A. Jaross, Downers Grove, Ill., assignors to the United States of America as represented by the United States Atomic Energy Commission
Filed Apr. 25, 1960, Ser. No. 24,626
8 Claims. (Cl. 219—9.5)

This invention relates to thermal or heat conducting bonds between two metals. More particularly it relates to a new and novel means and method for effecting a thermal bond with an electrically-conductive, liquifiable metal and is especially adaptable to the fabrication of metal clad fuel elements for nuclear reactors.

Many nuclear reactors require discrete bodies of neutron fissionable material such as uranium or plutonium in the metallic state. The presently known fissionable fuels in their metallic form are quite corrosive when in contact with many of the mediums used to cool nuclear reactors such as air or water. It has therefore become quite common to clad the nuclear fuel bearing bodies in jackets of relatively noncorrosive metals.

For maximum heat removal from the nuclear fuel, provisions must be made for readily transmitting the heat between the fuel material and the jacket. In many reactors, it is sufficient to bond the jacket material directly to the fuel containing body by mechanical pressure methods. However, in reactors having extremely high heat fluxes such as the Experimental Breeder Reactor disclosed in the inventors' copending application, S.N. 697,295, filed November 18, 1957, now United States Patent No. 2,961,393, other considerations must be taken into account. Provisions must be made in the design of the fuel elements for the expansion differential between the fuel and jacket materials, the nuclear growth of the fuel material, and the buildup of fission gases within the inclosing jacket. The fuel element disclosed in our above-identified copending application is an example of one design which will meet these requirements and comprises a body of metallic nuclear fuel loosely contained within a metal jacket; the interstice therebetween filled with a thermal conducting material which is in its liquid state at the operating temperature of the reactor.

In the fabrication of this type of fuel element it is required that no voids be present in the thermal conducting material and that all fuel body and cladding surfaces be thoroughly wetted by the liquid bonding material. In accordance with the present art, the fuel elements are sealed and placed in a centrifuge which has a heating element. The bonding material is melted into a fluid and forced between the fuel body and the interior wall of the jacket by the centrifugal force to obtain a thermal conducting bond therebetween. The fuel element is then removed and heated to a very high temperature for a length of time to obtain as thorough a wetting as possible. This method is quite time consuming, and somewhat ineffective in removing all of the voids in the bonding material.

Where fuel elements are to be made from reprocessed fuel material from a breeder type nuclear reactor such as the one disclosed in the hereinbefore referenced patent it is required that the method and apparatus be suitably adaptable to remote control operation. The high level radiation attendant with the usage of the bred and/or recovered fuel materials precludes any manual manipulation of the fuel elements or the apparatus used in their fabrication. The apparatus must be free of materials which deteriorate in the presence of radioactivity and must be relatively maintenance free. All of the steps of the method must be performable by either remote manual manipulation or by automatic means. It will be noted that the old method of centrifuging and subsequently heating for surface wetting does not meet the requirements for usage in a highly radioactive atmosphere.

It is therefore an object of this invention to provide a method and means for establishing a thermal bond between two metallic surfaces.

It is another object of this invention to provide a method and means for establishing a thermal bond in which all voids in the bond material are eliminated and the confronting metal surfaces are adequately wetted.

It is also an object of this invention to provide a method and means for establishing a thermal bond between confronting metal surfaces which may be utilized in the presence of a highly radioactive atmosphere.

In accordance with this invention the electrically conductive thermal bonding material is melted and caused to flow between the confronting surfaces. The bonding material is further agitated by a moving magnetic field. The moving magnetic field, by motor action, establishes an electric current and driving forces which agitate the fluid material as well as heat it. The combination heating and agitating drives out any voids in the material as well as wets the confronting metal surfaces. The bonding material is then selectively cooled to prevent the formation of voids as the material shrinks when cooling.

The invention will be better understood with the following detailed description making reference to the accompanying drawings in which:

FIGURE 1 is an elevation view of the apparatus and illustrates one embodiment of this invention;

FIGURE 2 is a vertical partial section of the apparatus of FIGURE 1 taken along the line 2—2 of FIGURE 3 showing the electromagnetic section thereof;

FIGURE 3 is a horizontal section of the embodiment shown in FIGURE 1 and is taken along the line 3—3 of FIGURE 2;

FIGURE 4 is a horizontal section view taken along the line 4—4 of FIGURE 2;

FIGURE 5 is a schematic view showing the electrical connections at the bottom end of the electromagnet section shown in FIGURE 2;

FIGURE 6 is a schematic view showing the electrical connections at the top end of electromagnetic section shown in FIGURE 2;

FIGURE 7 is a vertical section view of one type of nuclear reactor fuel element upon which this invention may be used.

The embodiment shown in FIG. 1 comprises an upper heater section 10 axially aligned and attached to an electromagnetic lower section 12. The device is supported in a vertical position by braces 14 and has an axial passage 16 passing through the electromagnet section 12 and the heater section 10, which is accessible at the lower end of the electromagnetic section 12. The passage 16 is adapted to receive a workpiece 18 such as a fuel element of the type shown in FIG. 7 and disclosed in the copending application hereinbefore referenced. For the purposes of this description the workpiece 18 will hereinafter be referred to as a fuel element although it is to be understood that there may be many other applications to which the teachings of this invention are readily adaptable.

The fuel element 18 is readily translatable within the passage 16 in the heater and electromagnetic sections by means of a driving mechanism 20. The driving mechanism is attachable to the adaptor end 21 of the fuel element and is positioned to insert and extract it through the bottom end of the device. A cooling element 22 is located adjacent the bottom end of the device, the purpose of which will be hereinafter described.

The preliminary heater section 10 is an electrically operated and controlled oven which is capable of heating the fuel element to a temperature sufficient to melt the bonding material. It comprises a heating wire 23 (FIG. 2) within a supporting tube 24 which is flanged at its lower end connecting it to the electromagnetic section 12. Suitable insulation 26 is provided around the tube 24 along its entire length.

The electromagnet section 12 comprises a ferromagnetic core 30 which is energized by a number of electrical windings consisting of two copper segments 42 and connecting elements as will be explained later, to set up a magnetic field. The core 30 as seen in FIG. 3 is essentially a circular shell 33 having six wedge-shaped segments 34 extending radially inward. The core is made up of a large number of stacked laminations 36 (FIG. 2) which are each coated with an insulating coating such as a chrome oxide paint. The laminations 36 are held together in rigid assembly by four bolts 38 which secure the core 30 to an end plate 40 at its upper end. The end plate 40 is the supporting member for the apparatus to which the braces 14 as well as the heater section 10 are secured.

Each winding, as already mentioned, is formed of two copper conductor segments 42 (FIG. 3), one on each side of each core segment 34 interconnected at their upper ends by a conductor plate 44 welded to said segments. Two conductor segments 42 fit snugly within each space between adjacent core segments 34 and are insulated from each other and from the core segments as shown at 45 (FIG. 2). The inner surfaces 46 of the core segments 34 are arcuate shaped thus forming the passage 16 for receiving the fuel elements. The conductors 42 extend below the core 30 and are interconnected to each other by straps 47 and to a power source as shown in the schematic diagrams of FIG. 5 and FIG. 6, and hereinafter described.

The schematic diagram of FIG. 6 represents the device as viewed from above. The single wire connections between the two conductors 42 on either side of the core segment 34 represent the conductor plates 44. The two conductors 42 interconnected by the plate 44 form, effectively, the one-turn winding 32 around the enclosed core segment 34 and the tip of the segment 34 near the center of the device is a magnetic pole end of the electromagnet so formed.

The schematic diagram of FIG. 5 represents the device as viewed from below and shows the device connected in a Y-configuration to a three-phase power source 48. The interconnecting wires shown therein are representative of the conductor straps 47 hereinbefore mentioned. It will be noted that each coil winding is connected in series with its oppositely disposed coil winding so that the current flowing therein at any one point in time will cause the magnetic flux in their corresponding core segments 34 to be oriented in the same direction. Three sets of serially connected windings are thus formed and are connected to one another at their electrical ends 50. The other electrical ends of the sets of serially connected windings are connected by lines 52 to the three-phase A.C. power source.

A three-phase power source transmits a time varying electric current to the windings surrounding the core segments 34. The magnetic field established thereby rotates about the axis of device in a manner corresponding to a synchronous alternating current motor. Electric currents are energized within the passage 16 therein which cause it to rotate about its axis if so permitted. It is this motor action of the rotating magnetic field which agitates the electric conducting bonding material to remove the voids and wet the surfaces.

Since the device is to be used in the remote control manipulation of radioactive nuclear fuel elements, it is advantageous that the power source be a low-voltage, high-current generator (e.g. 1–10 volts, 1000 amperes). This eliminates serious insulation problems between the individual conductor segments 42 and the core 30. It is to be understood that while only one type of connection has been shown, others may be used with satisfactory results. For example, the turns might be delta-connected to the power source or they may be interconnected in such a way as to be operable with other multiple phase power sources such as two or six-phase.

The cooling element 22 (FIGURES 1 and 4) is positioned below the lower ends of the conductor segments 42. It comprises a hollow ring 53 having four inwardly projecting nozzles 54, and is connected by a tube 56 to an air supply, not shown.

A fuel element of the type for which the particular embodiment of the invention described herein was designed is shown in FIG. 7. It comprises a pin 58 of nuclear fuel alloy fitted into a thin walled tube 60. The adaptor 21 seals the lower end of the tube 60 and a restrainer cap 62 seals the upper end. There is a small clearance between the pin 58 and the tube 60. A pellet of sodium 64 is sealed within the fuel element 18 below the fuel pin 58 when it is assembled.

After the fuel element 18 is assembled and sealed it is inserted into the heater section 10 of the device by the mechanism 20. The fuel element is heated to a temperature sufficient to melt the sodium pellet 64 therein so that the fuel pin 58 settles to the position abutting the adaptor 21 forcing the sodium upward through the annulus between the pin 58 and the tube 60. The fuel element 18 is then lowered into the electromagnet section 12 where it is subjected to the rotating field which generates an electric current in the sodium essentially in the direction of the axis of the fuel element. This current interacts with the magnetic field to thus rotate the sodium within the annulus around the axis of the fuel element. The large electric currents in the electromagnet section maintain a sufficient degree of heat to keep the sodium melted while it is being acted upon by the magnetic field.

After the fuel element has been subjected to the electromagnetic field a sufficient time to remove any voids in the sodium and adequately wet the surfaces of the fuel pin and tube, the fuel element is extracted slowly downward, out of the electromagnetic section and through the cooling element 22. Cooling with the air from the cooling element 22 insures that the sodium within the fuel element solidifies progressively from the bottom to the top as the element is extracted. If the element is not properly extracted from the device and selectively cooled the sodium in the upper part of the fuel element might solidify before the lower part and cause voids due to shrinking.

It is to be understood that there are many well known ways of heating a workpiece and that there are also many ways to apply a moving magnetic field. For example the heater section might be eliminated from the device and the heat caused by the current in generating the electromagnetic field may be used to initially melt the sodium. A rotating magnetic field might be provided by physically rotating a permanent magnet around the workpiece or the same effect might be had if a steady magnetic field were maintained and the workpiece was moved therethrough. It would also be obvious to one skilled in the art that a device could be constructed whereby the magnetic field is caused to move longitudinally along the length of the rod and thus cause agitation of the liquid bonding material. It is, therefore, the intention of the inventors to be restricted only by the scope of the appended claims.

What is claimed is:

1. A device for effecting a metallic bond between a rod and a surrounding jacket comprising: a ferromagnetic core, said core comprising essentially a circular shell having six equally spaced wedge-shaped segments extending radially inward therefrom, two wedge-shaped electrical conductors within each space between adjacent core segments, said conductors insulated from one another and from said core segments, the inner surfaces of said segments and said conductors forming an aperture to receive said jacketed rod, means for electrically connecting the two electrical conductors immediately adjacent each core segment at the one ends of said conductors, means for serially connecting oppositely disposed pairs of electrically connected conductors forming three sets thereof, means for interconnecting the sets of serially connected conductors at their one electrical ends, and means for applying a three-phase alternating current to said sets of serially connected conductors at their other electrical ends.

2. A device for effecting a metallic bond between a rod and a surrounding jacket comprising a ferromagnetic core, said core comprising essentially a circular shell having six equally spaced wedge-shaped segments extending radially inward therefrom, an electrical conductor surrounding each of said segments and insulated therefrom, the inner surfaces of said segments forming an aperture to receive said jacketed rod, means for serially connecting the electrical conductors surrounding oppositely disposed core sections forming three sets thereof, means for interconnecting said sets of serially connected conductors at their one electrical ends, and means for applying a three-phase alternating current to said sets of serially connected conductors at their other electrical ends.

3. A device for effecting a metallic bond between a rod and a surrounding jacket comprising a ferromagnetic core, said core comprising a plurality of vertically stacked laminations forming essentially a circular shell having six equally spaced wedge-shaped segments extending radially inward therefrom, two solid wedge-shaped electrical conductors within each space between adjacent core sections, said conductors insulated from one another and from said core segments, the inner surfaces of said segments and said conductors forming an aperture to receive said jacketed rod, a conducting plate for electrically connecting the two electrical conductors immediately adjacent each core segment at the one ends of said conductors, thereby forming a coil winding around said core section, conducting straps for serially connecting the coil turns of oppositely disposed core segments forming three sets thereof, other conducting straps for interconnecting the sets of serially connected conductors at their one electrical ends, and means for applying a three-phase alternating current to said sets of serially connected conductors at their other electrical ends.

4. A method for establishing a metallic bond between a rod and a surrounding jacket comprising introducing molten bond metal in the interstice between said rod and said jacket, agitating said molten metal with a magnetic field rotating about the axis of said rod while maintaining said metal in a fluid phase, and selectively cooling said metal to prevent voids in the bonding metal.

5. A method for establishing a metal bond between a vertically extending rod and a surrounding jacket comprising melting a capsule of metal enclosed within said jacket, agitating said molten metal with a magnetic field rotating about the vertical axis of said rod while maintaining said metal in a liquid phase and cooling the jacket and rod to form a bond as it is drawn downward out of the rotating magnetic field.

6. A device for effecting a metallic bond between a rod and a surrounding jacket comprising a ferromagnetic core, said core comprising essentially a circular shell having a plurality of wedge-shaped segments extending radially inward therefrom, an electrical conductor surrounding each segment and insulated therefrom, the inner surfaces of said segments and said conductors forming an aperture to receive said jacketed rod, and means for applying a multiphase alternating current to said conductors.

7. A device for effecting a metallic bond between a rod and a surrounding jacket comprising a plurality of ferro-magnetic segments adjacent and extending along the length of said jacket rod, an electrical conductor surrounding each segment and insulated therefrom, and means for applying a time varying electric current to said conductors.

8. A device for effecting a metallic bond between a rod and a surrounding jacket comprising means for introducing said bond metal in a molten state into the interstice between said rod and jacket, a plurality of energized magnetic pole ends adjacent said jacketed rod, said energized magnet pole ends establishing a magnetic flux through said molten metal, and means for time varying the orientation of said magnetic field, whereby said molten metal is agitated in the interstice by motor action.

References Cited in the file of this patent

UNITED STATES PATENTS

| | | |
|---|---|---|
| 2,152,194 | Jones | Mar. 28, 1939 |
| 2,684,425 | Vickland | July 20, 1954 |